United States Patent
Jang

(10) Patent No.: US 11,904,190 B2
(45) Date of Patent: Feb. 20, 2024

(54) LIFE-SAVING TOWEL WITH FUNCTION OF GENERATING OXYGEN

(71) Applicant: SAVING STORY CO., LTD, Gyeonggi-do (KR)

(72) Inventor: Seung Jang, Gyeonggi-do (KR)

(73) Assignee: SAVING STORY CO., LTD., Hwaseong-si (KR)

( * ) Notice: Subject to any disclaimer, the term of this patent is extended or adjusted under 35 U.S.C. 154(b) by 0 days.

(21) Appl. No.: 18/219,256

(22) Filed: Jul. 7, 2023

(65) Prior Publication Data

US 2023/0347188 A1  Nov. 2, 2023

Related U.S. Application Data

(63) Continuation of application No. PCT/KR2022/010524, filed on Jul. 19, 2022.

(30) Foreign Application Priority Data

Jan. 20, 2022  (KR) ........................ 10-2022-0008255

(51) Int. Cl.
| | |
|---|---|
| *A62B 21/00* | (2006.01) |
| *A62B 23/00* | (2006.01) |
| *C01B 13/02* | (2006.01) |

(52) U.S. Cl.
CPC .............. *A62B 21/00* (2013.01); *A62B 23/00* (2013.01); *C01B 13/0211* (2013.01)

(58) Field of Classification Search
CPC ...... A62B 21/00; A62B 23/00; C01B 13/0211
See application file for complete search history.

(56) References Cited

U.S. PATENT DOCUMENTS

| 3,797,854 A * | 3/1974 | Poole .................... F42B 3/04 |
| | | 149/35 |
| 2006/0090756 A1* | 5/2006 | Mawhirt ................ A62B 21/00 |
| | | 128/201.29 |
| 2021/0316170 A1* | 10/2021 | Domoy ................ A62B 23/025 |

FOREIGN PATENT DOCUMENTS

| KR | 10-2018-0057056 A | 5/2018 |
| KR | 10-2063265 B1 | 3/2020 |

OTHER PUBLICATIONS

Office Action issued by Korean Intellectual Property Office in priority application KR 10-2022-0008255, dated May 15, 2022, pp. 1-9.

(Continued)

*Primary Examiner* — Valerie L Woodward
(74) *Attorney, Agent, or Firm* — Dinsmore & Shohl

(57) ABSTRACT

A life-saving towel generates oxygen in the event of an emergency such as a fire to enable a user to survive for a long time. The life-saving towel includes: a filter sheet; an oxygen generating receptor in which an oxygen generating material is accommodated and which is coupled to one surface of the filter sheet; an oxygen generating receptor barrier frame in contact with the other surface of the filter sheet, which is coupled to the oxygen generating receptor with the filter sheet interposed therebetween and has a plurality of empty spaces formed therein; and an oxygen generating cover in contact with the other surface of the oxygen generating receptor barrier frame to cover all of the plurality of empty spaces of the oxygen generating receptor barrier frame and having a bonding portion formed on one surface to be bonded to the oxygen generating receptor barrier frame.

15 Claims, 23 Drawing Sheets

(56) References Cited

OTHER PUBLICATIONS

Decision to Grant issued by Korean Intellectual Property Office in priority application KR 10-2022-0008255, dated May 31, 2022, pp. 1-4.

\* cited by examiner

[FIGURE 1]
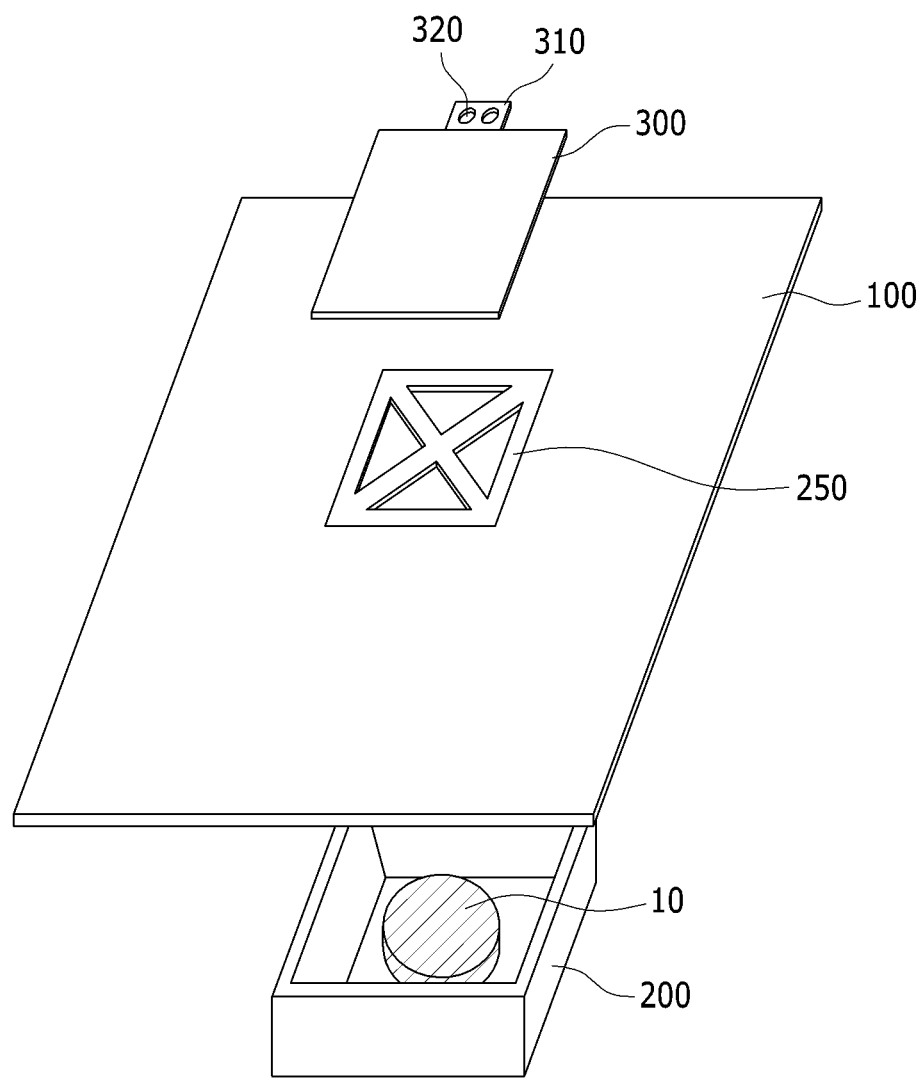

[FIGURE 2]
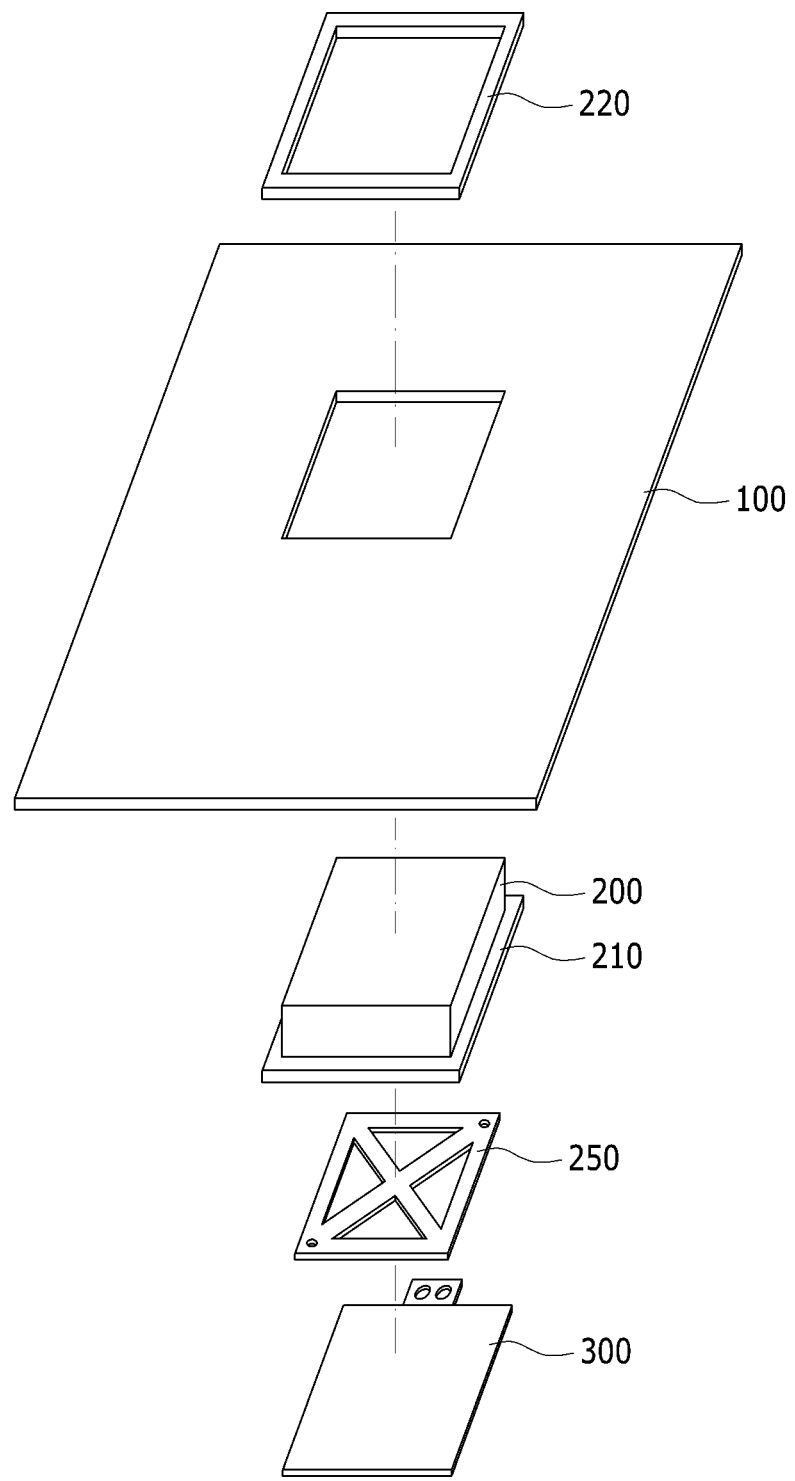

【FIGURE 3】
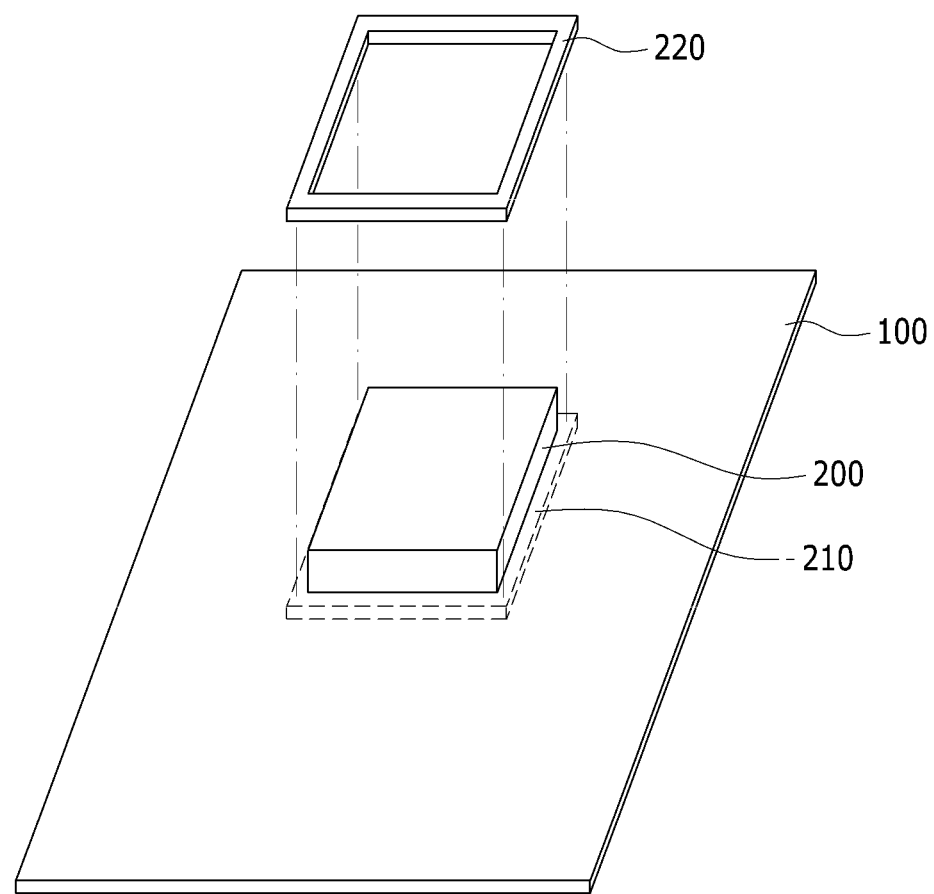

【FIGURE 4】
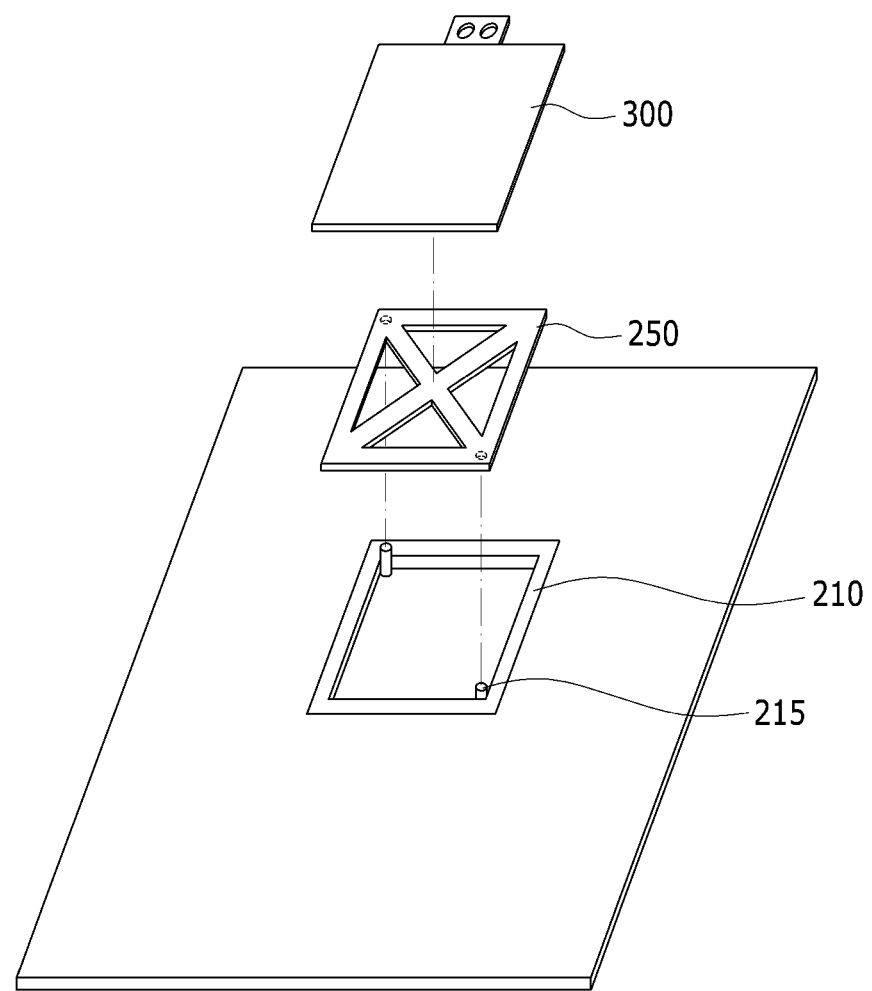

[FIGURE 5]
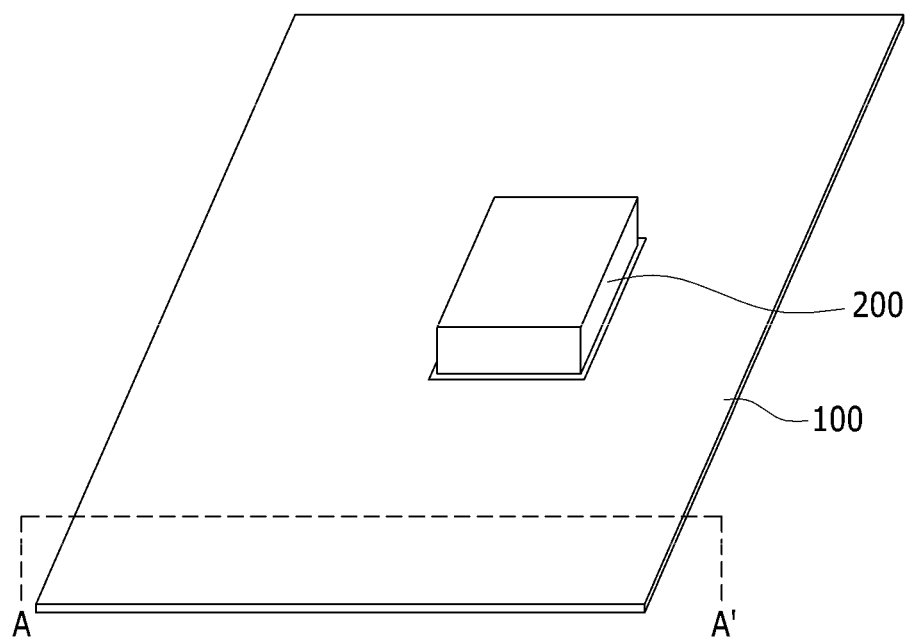

[FIGURE 6]
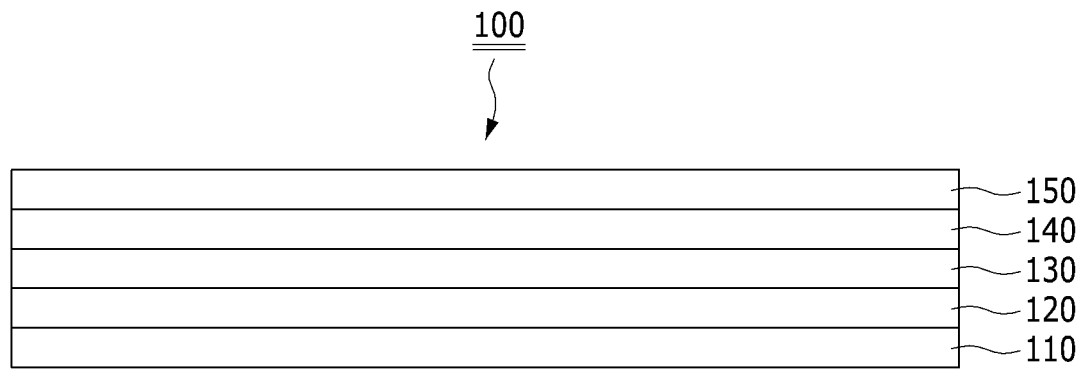

[FIGURE 7]
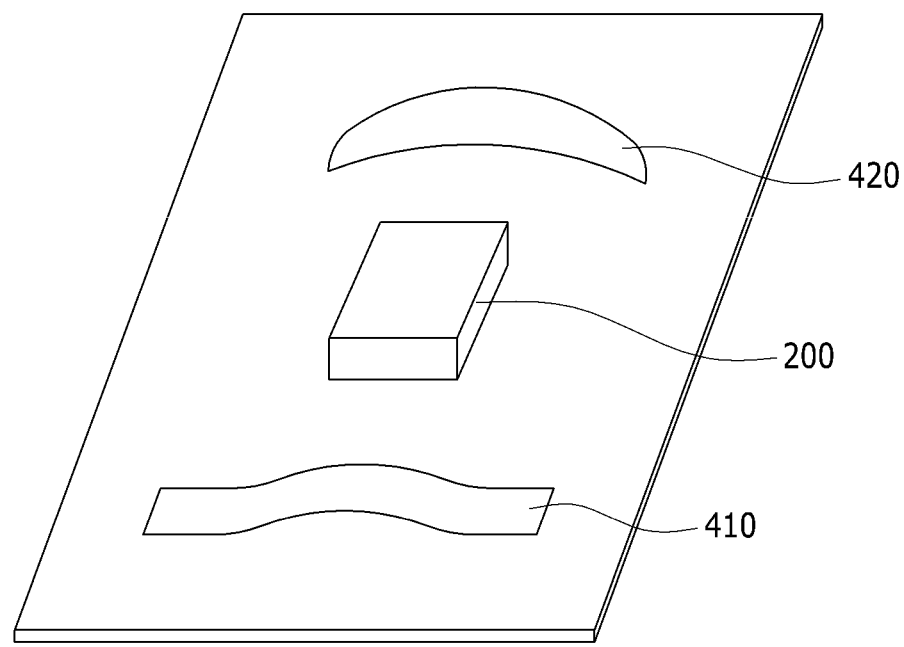

【FIGURE 8】
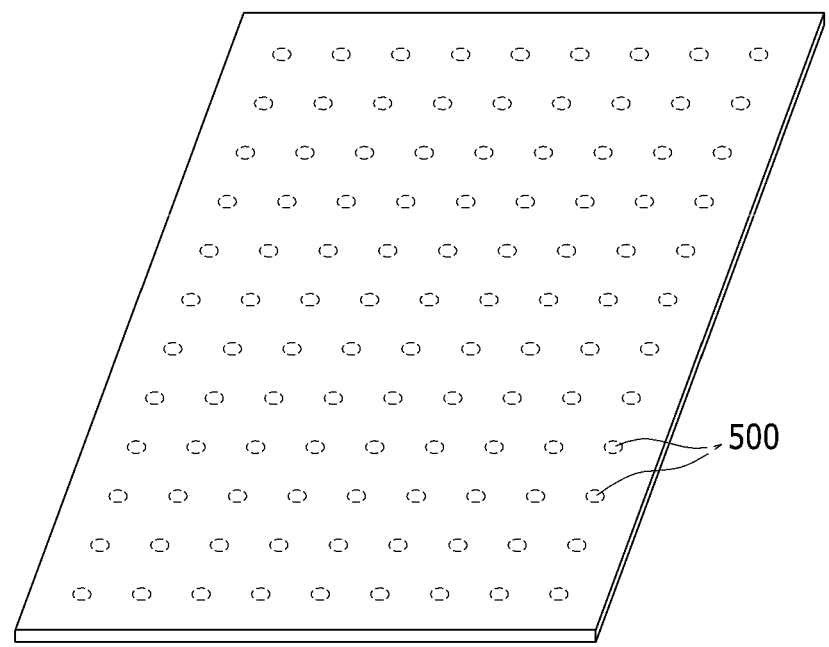

[FIGURE 9]
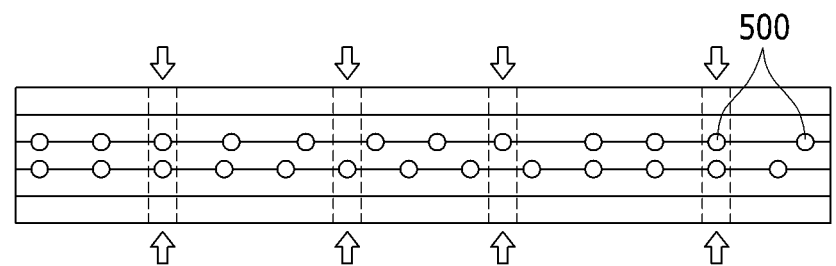

[FIGURE 10]
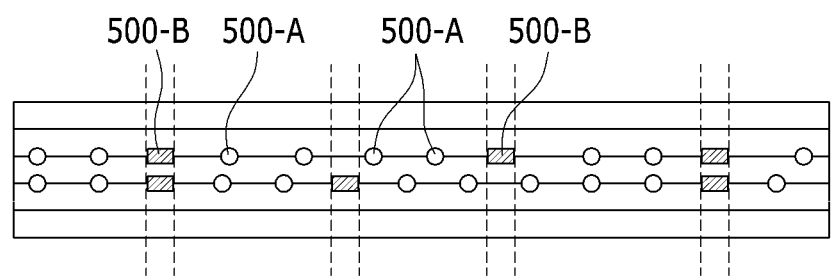

【FIGURE 11】
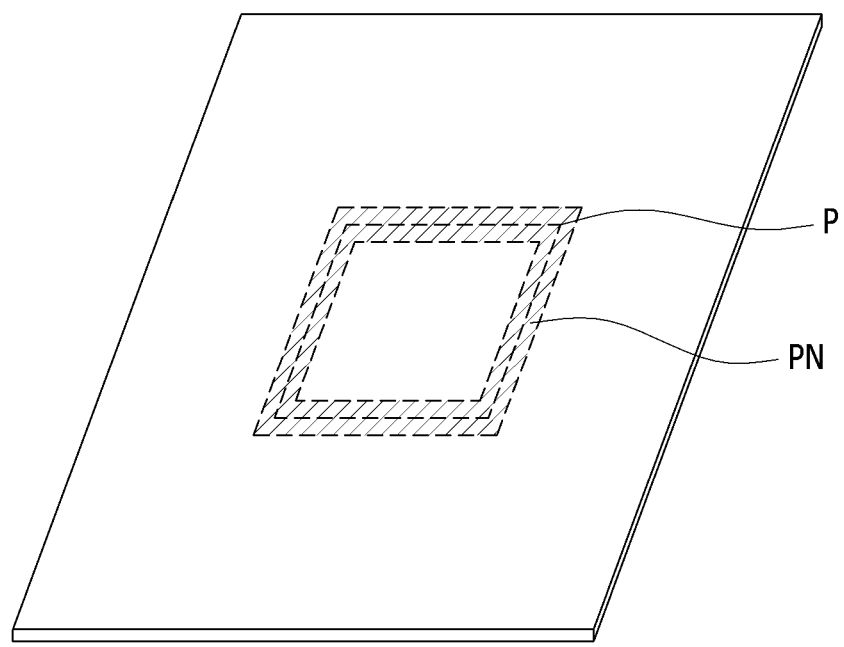

[FIGURE 12]
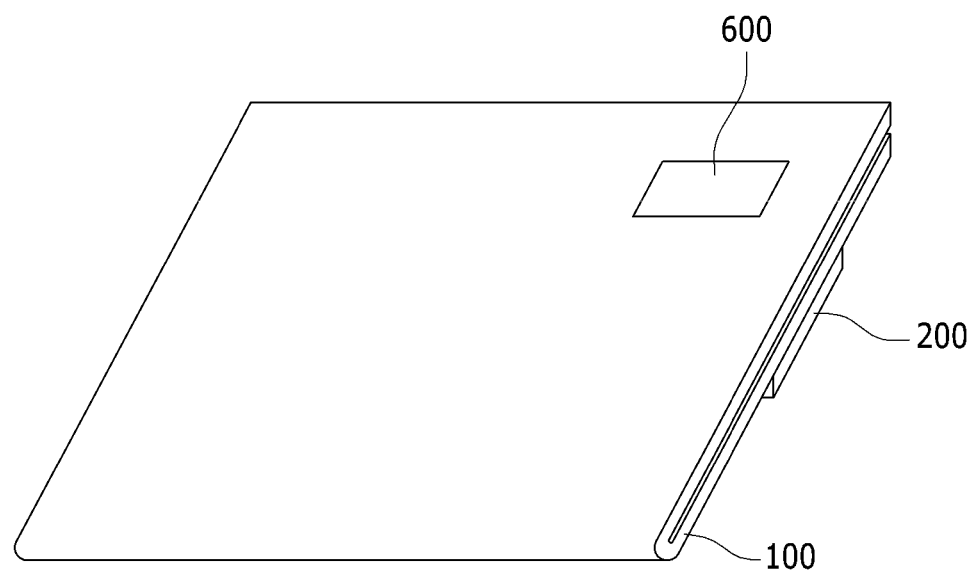

[FIGURE 13]
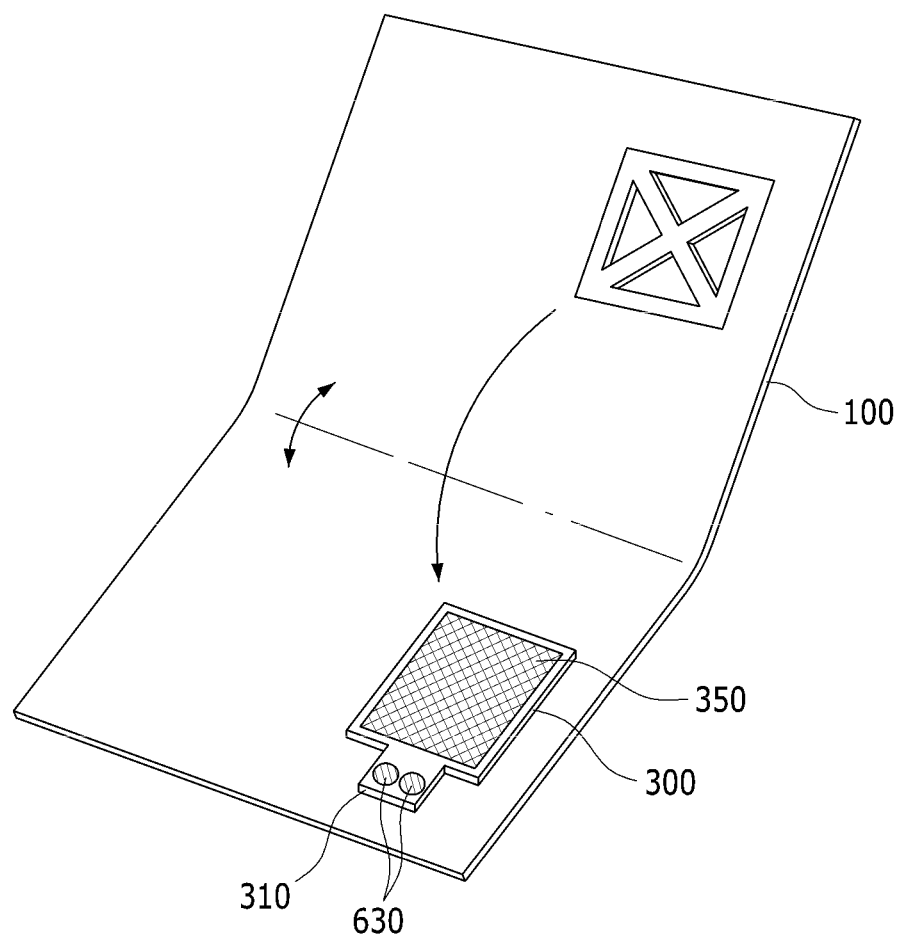

[FIGURE 14]
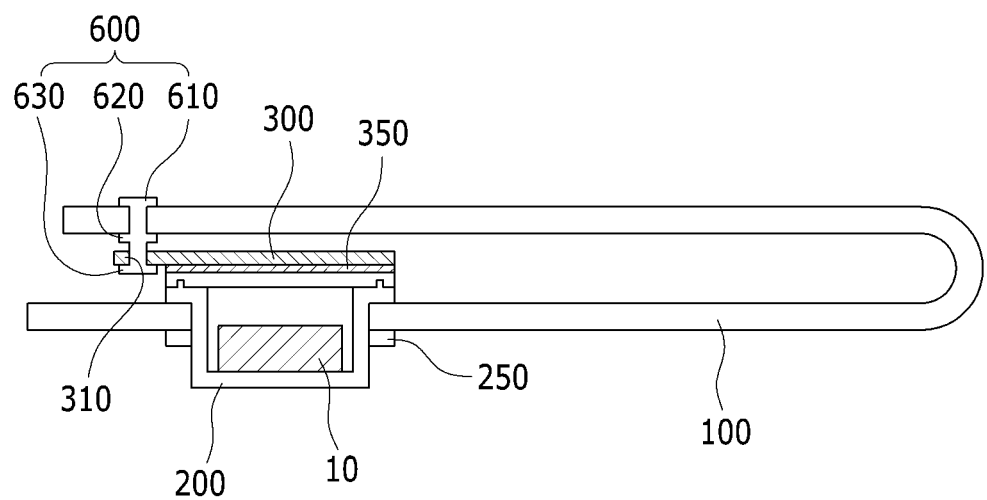

[FIGURE 15]
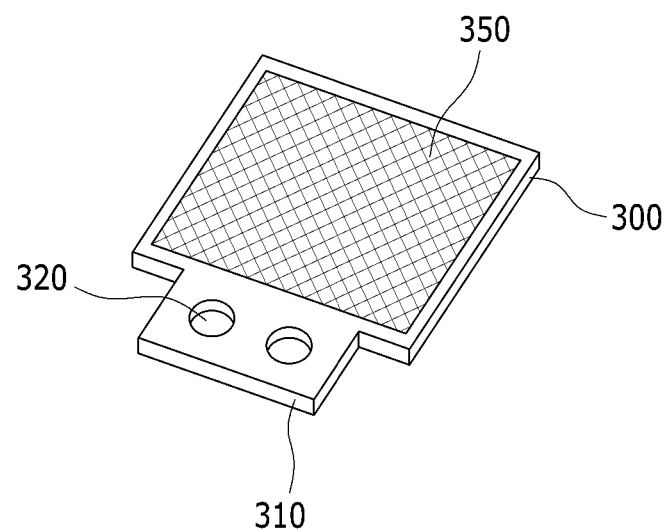

[FIGURE 16]
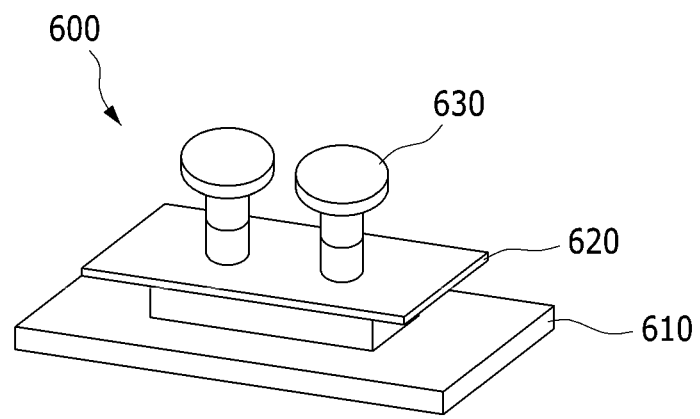

[FIGURE 17]
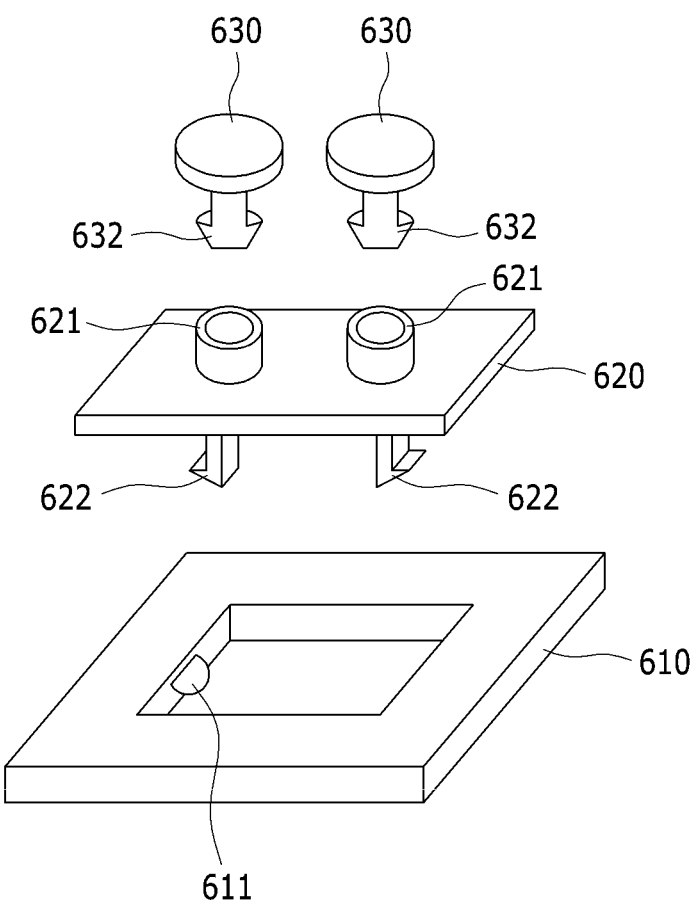

[FIGURE 18]
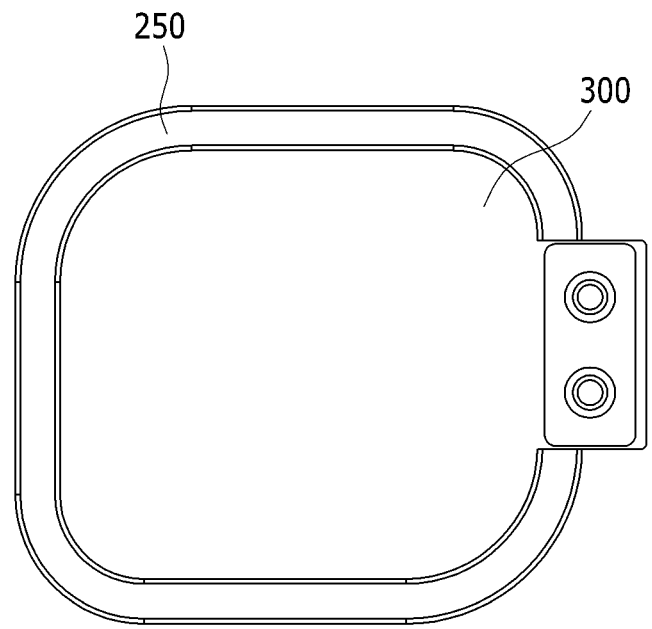

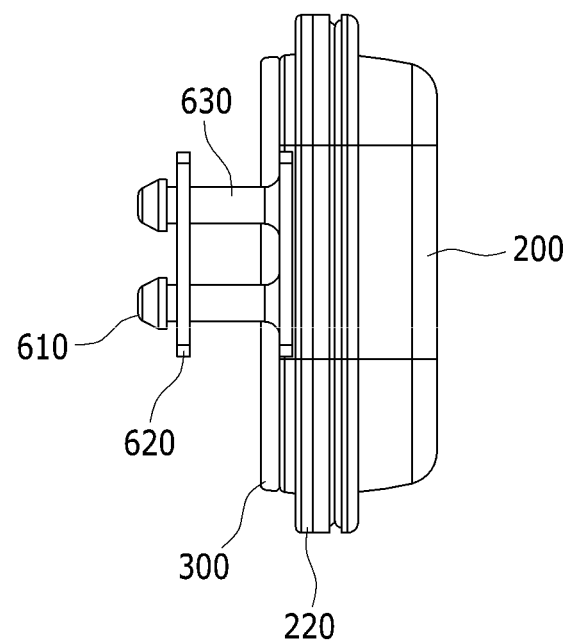
[FIGURE 19]

[FIGURE 20]
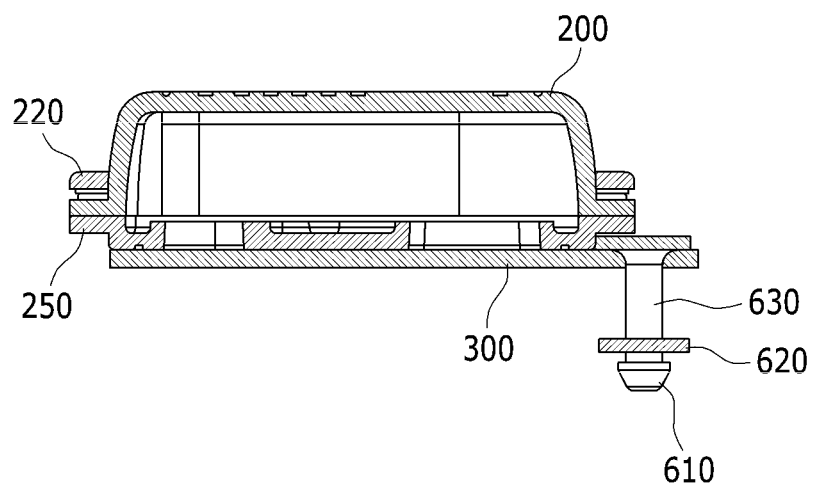

[FIGURE 21]
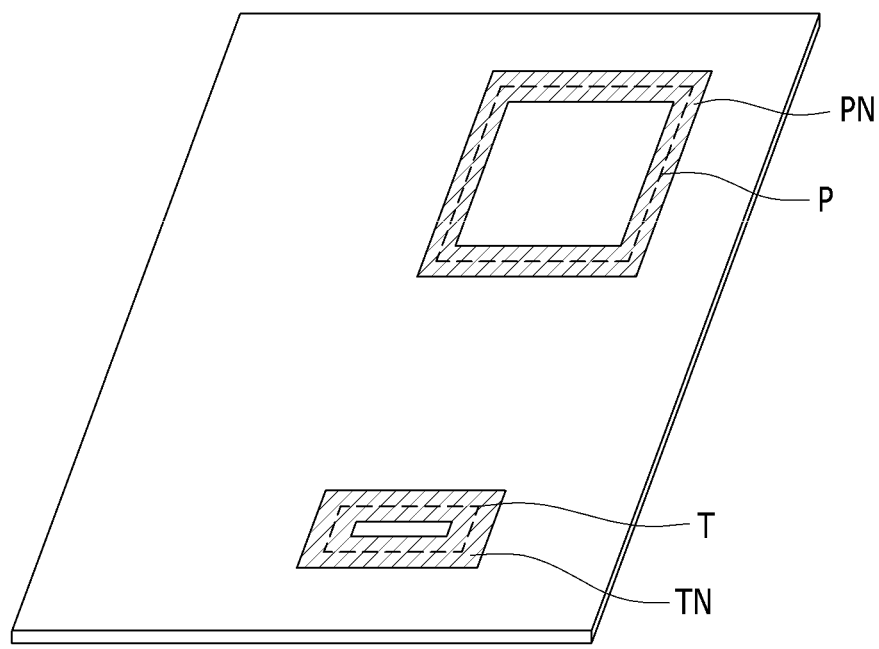

[FIGURE 22]
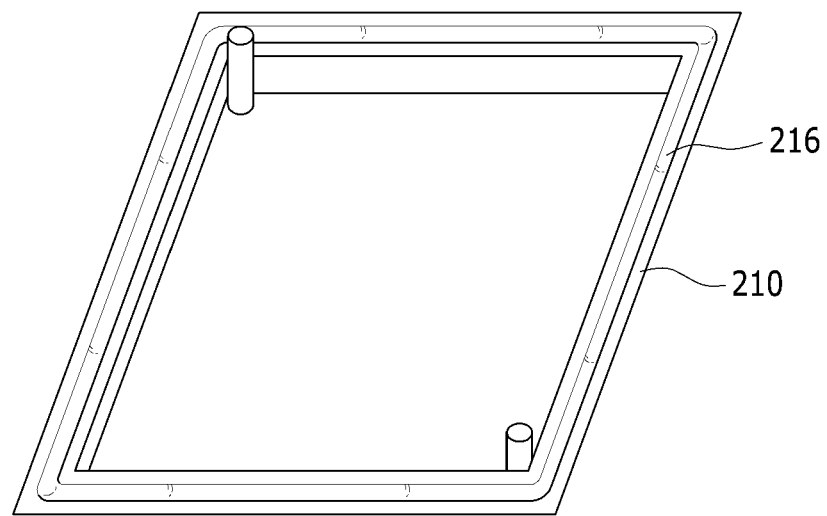

[FIGURE 23]
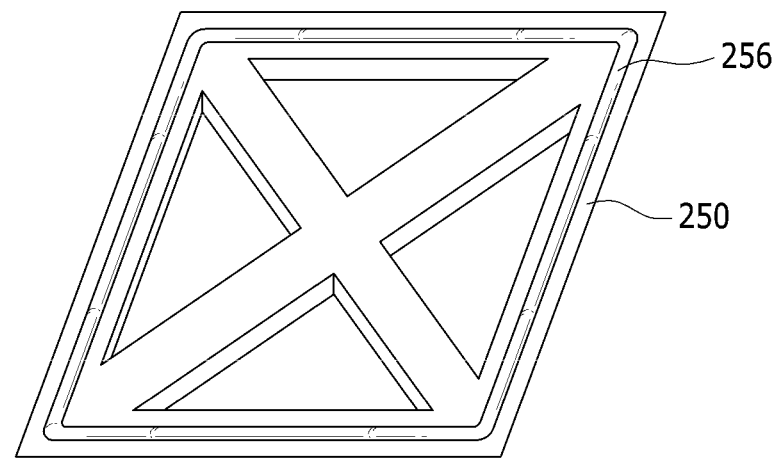

LIFE-SAVING TOWEL WITH FUNCTION OF GENERATING OXYGEN

CROSS-REFERENCE TO RELATED APPLICATION

This application is a continuation of International Patent Application No. PCT/KR2022/010524 filed on Jul. 19, 2022 which claims priority to and the benefit of Korean Patent Application No. 10-2022-0008255 filed in the Korean Intellectual Property Office on Jan. 20, 2022, the entire contents of which are incorporated herein by reference.

TECHNICAL FIELD

The present disclosure relates to a life-saving towel that enables a user to survive for a long time by generating oxygen and can be used quickly and conveniently in the event of an emergency such as a fire.

BACKGROUND ART

In the event of a disaster such as a fire, people may be physically injured by the heat of the fire and lose their lives, but toxic gas that has been generated enters the respiratory tract of those people so that many of them may die from suffocation from smoke even if their bodies are not injured by the fire.

Therefore, in the event of a fire, it is important to avoid the fire, but, first of all, one must avoid inhaling smoke containing a large amount of toxic gas as much as possible to survive until a rescue team arrives and increase one's chances of survival.

In the event of an emergency such as a fire, people cover their mouth and nose with a towel while breathing to prevent suffocation from smoke, or cover their mouth and nose with a towel soaked in water to breathe. However, with such a method of simply using a towel soaked in water, it is difficult to survive for a long time. Thus, there is a need for a disaster safety product that allows users to survive for a longer time while blocking toxic gases entering the users' respiratory system as much as possible.

DISCLOSURE

Technical Problem

Accordingly, the purpose of the present disclosure is to provide a life-saving towel that supplies oxygen to a user's respiratory system by an oxygen generating device generating oxygen on its own while blocking toxic gases from entering the user's respiratory system in the event of a disaster such as a fire in order to enable the user to survive for a long time.

The purpose of the present disclosure is also to provide the life-saving towel capable of preventing product damage caused by unnecessary oxygen generation when the life-saving towel is not in use.

The purpose of the present disclosure is also to provide the life-saving towel that immediately generates oxygen by removing an oxygen generating cover as soon as the life-saving towel is unfolded in an emergency situation.

The purpose of the present disclosure is also to provide the life-saving towel with improved durability in which the oxygen generating device can remain firmly installed on a sheet.

Technical Solution

In order to achieve the above-mentioned purposes, the present disclosure may provide a life-saving towel including: a filter sheet; an oxygen generating receptor in which an oxygen generating material is accommodated and which is coupled to one surface of the filter sheet; an oxygen generating receptor barrier frame in contact with the other surface of the filter sheet, which is coupled to the oxygen generating receptor with the filter sheet interposed therebetween and has a plurality of empty spaces formed therein; and an oxygen generating cover in contact with the other surface of the oxygen generating receptor barrier frame to cover all of the plurality of empty spaces of the oxygen generating receptor barrier frame and having a bonding portion formed on one surface to be bonded to the oxygen generating receptor barrier frame.

The oxygen generating receptor further includes an oxygen generating receptor rib formed on an edge portion; the filter sheet includes an area as an empty space in a shape corresponding to the shape of the horizontal surface of the oxygen generating receptor; there is further included an oxygen generating receptor coupling frame having an empty space formed inside the rim in a shape corresponding to the shape of the oxygen generating receptor rib; while the oxygen generating receptor rib is in contact with the other surface of the filter sheet, the oxygen generating receptor is disposed on one surface of the filter sheet through the area as an empty space of the filter sheet; the oxygen generating receptor coupling frame passes through the oxygen generating receptor on one surface of the filter sheet and is coupled and fixed to the oxygen generating receptor rib with a part of the filter sheet interposed therebetween; and the oxygen generating receptor barrier frame is directly coupled to the other surface of the oxygen generating receptor rib.

The oxygen generating receptor rib and the oxygen generating receptor coupling frame are coupled to each other by thermal fusion, and the oxygen generating receptor barrier frame is coupled with the oxygen generating receptor rib as an oxygen generating receptor coupling hole on the oxygen generating receptor rib is bonded to a corresponding depression on the oxygen generating receptor barrier frame by the concavo-convex (凹凸) bonding.

The oxygen generating material includes activated carbon, 5 to 50 parts by weight of a metal peroxide, and 0.001 to 5 parts by weight of a catalyst based on 100 parts by weight of the activated carbon, and the activated carbon is at least one of palm, wood, and coal; the metal peroxide is at least one of calcium peroxide, magnesium peroxide, potassium peroxide, barium peroxide, and sodium peroxide; and the catalyst is at least one of catalase, peroxidase, potassium iodide, and manganese dioxide.

Straps coupled to one surface of the filter sheet to which the oxygen generating receptor is exposed are further included, and both ends of the straps are coupled to one surface of the filter sheet while middle portions thereof are spaced apart therefrom.

The straps include a first strap and a second strap spaced apart from each other on both sides of one surface of the filter sheet with the oxygen generating receptor interposed therebetween, and the middle portions of the first strap and the second strap spaced apart from the surface of the filter sheet face each other with the oxygen generating receptor interposed therebetween.

The adhesive strength of the bonding portion is in the range of 25 N/25 mm to 35 N/25 mm at 50% humidity and in the range of 25 N/25 mm to 35 N/25 mm at 85% humidity.

The oxygen generating cover includes an oxygen generating cover protruding surface protruding from one side of the oxygen generating cover so as not to come into contact with the oxygen generating receptor barrier frame and an oxygen generating cover through-hole penetrating the oxygen generating cover protruding surface in a vertical direction, the filter sheet further includes a cover opening member having one end coupled to the filter sheet and spaced apart from a portion where the oxygen generating receptor is coupled, and the other end of the cover opening member is connected to the oxygen generating cover through-hole.

At least two oxygen generating cover through-holes are disposed spaced apart from each other.

The cover opening member has one end penetrating the filter sheet to be coupled thereto and the other end coupled to the oxygen generating cover through-hole.

The cover opening member includes: an outer sheet support portion that penetrates the filter sheet to support one surface of the filter sheet and has a larger area than the area through which the outer sheet support portion passes; an inner sheet support portion that extends from the outer sheet support portion, penetrates the filter sheet to support the other surface of the filter sheet, and has a larger area than the area through which the inner sheet support portion passes; and a cover support portion that extends from the inner sheet support portion, penetrates the oxygen generating cover through-hole to support one surface of the oxygen generating cover through-hole, and has a larger area than the area through which the cover support portion passes.

The inner sheet support portion further includes an inner sheet support portion first connection portion formed at one end and an inner sheet support portion second connection portion formed at the other end, the cover support portion further includes a cover support portion connection portion formed at the other end and coupled to the inner sheet support portion first connection portion, and the outer sheet support portion further includes an outer sheet support portion connection portion formed at one end and coupled to the inner sheet support portion second connection portion.

When the filter sheet of the life-saving towel is folded, the outer sheet support portion, the inner sheet support portion, and the cover support portion of the cover opening member and the oxygen generating cover through-hole are vertically positioned on a straight line.

The cover opening member includes: the cover support portion having one end passing through the oxygen generating cover through-hole and a bottom end larger than the oxygen generating cover through-hole; the outer sheet support portion that has the other end passing through the filter sheet to support the filter sheet on one surface of the filter sheet, includes one end larger than the area where the outer sheet support portion passes through the filter sheet, and extends from the cover support portion; and the inner sheet support portion coupled between the outer sheet support portion and the oxygen generating cover through-hole and supporting the filter sheet on the other surface of the filter sheet.

When the filter sheet of the life-saving towel is folded, the outer sheet support portion, the inner sheet support portion, and the cover support portion of the cover opening member and the oxygen generating cover through-hole are vertically positioned on a straight line.

There are further included: an oxygen generating receptor rib depressed line formed as a depressed line within the other surface of the oxygen generating receptor rib and extending along the rim of the oxygen generating receptor rib to form a single closed curve line; and an oxygen generating receptor barrier frame protruding line that is formed as a line protruding outward from one surface of the oxygen generating receptor barrier frame and forms a single closed curve line to be inserted into the oxygen generating receptor rib depressed line.

Specific details of other embodiments are included in the detailed description and the drawings.

Advantageous Effects

According to the embodiments of the present disclosure, at least the following effects are provided.

The present disclosure provides a life-saving towel that supplies oxygen to a user's respiratory system by an oxygen generating device generating oxygen on its own while blocking toxic gases from entering the user's respiratory system in the event of a disaster such as a fire in order to enable the user to survive for a long time.

The present disclosure also provides the life-saving towel capable of preventing product damage caused by unnecessary oxygen generation when the life-saving towel is not in use.

The present disclosure also provides the life-saving towel that immediately generates oxygen by removing an oxygen generating cover as soon as the life-saving towel is unfolded in an emergency situation.

The present disclosure also provides the life-saving towel with improved durability in which the oxygen generating device can remain firmly installed on a sheet.

The effects according to the present disclosure are not limited by the contents exemplified above, and more various effects are included in the present specification.

DESCRIPTION OF DRAWINGS

FIG. 1 is a schematic exploded perspective view of a life-saving towel according to an embodiment of the present disclosure.

FIG. 2 is a schematic exploded perspective view of a life-saving towel according to another embodiment of the present disclosure.

FIG. 3 is a view for describing how an oxygen generating cover is coupled to a filter sheet of the life-saving towel in FIG. 2.

FIG. 4 is a view for describing how the oxygen generating cover is coupled to the filter sheet of the life-saving towel in FIG. 2 and a view of the sheet viewed from another direction after the coupling has been made as shown in FIG. 3.

FIG. 5 is a perspective view of the life-saving towel according to an embodiment of the present disclosure.

FIG. 6 is a cross-sectional view of a cross section of the filter sheet taken along the line A-A' in FIG. 5.

FIG. 7 is a perspective view of a life-saving towel according to still another embodiment of the present disclosure.

FIG. 8 is a perspective view of the filter sheet applied to the life-saving towel according to another embodiment of the present disclosure.

FIG. 9 is a schematic view of a cross section of the filter sheet in FIG. 8.

FIG. 10 is a schematic view of a cross section of the filter sheet in FIG. 9 taken after heat treatment.

FIG. 11 is a schematic view of the filter sheet according to still another embodiment of the present disclosure.

FIG. 12 is a perspective view schematically illustrating how the life-saving towel according to still another embodiment of the present disclosure is folded.

FIG. 13 is a perspective view of the unfolded life-saving towel in FIG. 12.

FIG. 14 is a view of a cross section of the folded life-saving towel in FIG. 12.

FIG. 15 is a perspective view of the oxygen generating cover according to an embodiment of the present disclosure.

FIG. 16 is a perspective view schematically illustrating a cover opening member according to an embodiment of the present disclosure.

FIG. 17 is an exploded perspective view schematically illustrating the cover opening member in FIG. 16.

FIG. 18 is a top view of the oxygen generating cover coupled to the oxygen generating device according to still another embodiment of the present disclosure.

FIG. 19 is a view of the oxygen generating cover coupled to the oxygen generating device in FIG. 18, which is viewed from one side.

FIG. 20 is a view of the oxygen generating cover coupled to the oxygen generating device in FIG. 18, which is viewed from another side.

FIG. 21 is a schematic view of the filter sheet according to still another embodiment of the present disclosure.

FIG. 22 is a perspective view of the oxygen generating receptor rib of the oxygen generating device according to another embodiment of the present disclosure.

FIG. 23 is a perspective view of the oxygen generating receptor barrier frame coupled to the oxygen generating device in FIG. 22 according to another embodiment of the present disclosure.

DETAILED DESCRIPTION OF MAIN ELEMENTS

- 10: oxygen generating material
- 100: filter sheet
- 110: first layer of filter sheet
- 120: second layer of filter sheet
- 130: third layer of filter sheet
- 140: fourth layer of filter sheet
- 150: fifth layer of filter sheet
- 200: oxygen generating receptor
- 210: oxygen generating receptor rib
- 215: oxygen generating receptor coupling hole
- 216: oxygen generating receptor rib depressed line
- 220: oxygen generating receptor coupling frame
- 250: oxygen generating receptor barrier frame
- 256: oxygen generating receptor barrier frame protruding line
- 300: oxygen generating cover
- 310: oxygen generating cover protruding surface
- 320: oxygen generating cover through-hole
- 350: bonding portion
- 410: first strap
- 420: second strap
- 500: hardened ball
- 600: cover opening member
- 610: outer sheet support portion
- 611: outer sheet support portion connection portion
- 620: inner sheet support portion
- 621: inner sheet support portion first connection portion
- 622: inner sheet support portion second connection portion
- 630: cover support portion
- 632: cover support portion connection portion

MODE FOR DISCLOSURE

The features and advantages of the present disclosure and the method to achieve them will become more apparent from the following detailed description in conjunction with the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Like reference numerals refer to like elements throughout the specification. In the drawings, sizes and relative sizes of layers and regions may be exaggerated for clarity.

Spatially relative terms, such as "beneath," "below," "lower," "above," "upper" and the like, may be used herein for ease of description to describe one element or feature's relationship to another element(s) or feature(s) as illustrated in the figures.

In this specification, although the terms first, second, etc. may be used to describe various elements, it should be understood that these elements are not limited by these terms. These terms are only used to distinguish one element from another. Therefore, a first element could be termed as a second element without departing from the scope of exemplary embodiments of the present disclosure.

Hereinafter, the embodiments of the present disclosure will be described with reference to the appended drawings.

FIG. 1 is a schematic exploded perspective view of a life-saving towel according to an embodiment of the present disclosure.

Referring to FIG. 1, the life-saving towel according to an embodiment of the present disclosure may include: a filter sheet 100; an oxygen generating receptor 200 in which an oxygen generating material 10 may be accommodated and which may be coupled to one surface of the filter sheet 100; an oxygen generating receptor barrier frame 250 that may be in contact with the other surface of the filter sheet 100 and that may be coupled to the oxygen generating receptor 200 with the filter sheet 100 interposed therebetween and have a plurality of empty spaces formed therein; and an oxygen generating cover 300 that may be in contact with the other surface of the oxygen generating receptor barrier frame 250 and cover all of the plurality of empty spaces of the oxygen generating receptor barrier frame 250 and that may include a bonding portion 350 on its one surface to be bonded to the oxygen generating receptor barrier frame 250.

The oxygen generating material 10 may be accommodated in the oxygen generating receptor 200, and one surface of the oxygen generating receptor 200 may be open while the side and bottom surfaces thereof may be blocked so that oxygen generated from the oxygen generating material 10 may flow into a user's respiratory tract. Therefore, other surfaces of the oxygen generating receptor 200, except for the one open surface, may be sealed off from the outside, and the oxygen generating receptor 200 may be completely sealed by the oxygen generating cover 300 when not in use.

The oxygen generating material 10 may include activated carbon, 5 to 50 parts by weight of a metal peroxide, and 0.001 to 5 parts by weight of a catalyst based on 100 parts by weight of the activated carbon; the activated carbon may be at least one of palm, wood, and coal; the metal peroxide may be at least one of calcium peroxide, magnesium peroxide, potassium peroxide, barium peroxide, and sodium peroxide; and the catalyst may be at least one of catalase, peroxidase, potassium iodide, and manganese dioxide. As such, the oxygen generating material 10 for generating oxygen may be accommodated in the oxygen generating device, which is sealed, and the accommodated material may generate pure oxygen by absorbing moisture and carbon dioxide in the air only when the oxygen generating cover 300 is separated. Consequently, a user can survive for a long time in case of an emergency because harmful gases from the outside may be blocked by the filter sheet 100 and oxygen may be generated only between the filter sheet 100 and the user's respiratory system by the oxygen generating material 10 accommodated in the oxygen generating device.

The oxygen generating receptor barrier frame 250 may be in contact with the surface opposite to the surface of the filter sheet 100 to which the oxygen generating receptor 200 is coupled and may be bound to the oxygen generating receptor 200 with the filter sheet 100 interposed therebetween. In addition, the plurality of empty spaces may be formed in the oxygen generating receptor barrier frame 250 so that the oxygen generating material 10 in the oxygen generating receptor 200 may be prevented from leaking out and may be more stably located in the oxygen generating receptor 200. That is, the oxygen generating cover 300 may be coupled to the oxygen generating receptor barrier frame 250 so that the oxygen generating material 10 may be finally completely blocked from the outside and sealed.

More specifically, the oxygen generating receptor barrier frame 250 may have a form in which the frames orthogonally cross on a horizontal surface so that the plurality of empty spaces may be formed therein. Therefore, the oxygen generating cover 300 may remain more stably coupled to the oxygen generating receptor barrier frame 250. In other words, the oxygen generating cover 300 coupled to the oxygen generating receptor barrier frame 250 may be prevented from sinking into the oxygen generating receptor 200 at the center by the frames orthogonal to each other on a horizontal plane, so that it may be possible to prevent the oxygen generating material 10 from being damaged by physical factors or from being consumed due to the generation of oxygen at an unwanted time and for oxygen to flow into a user's respiratory system through the plurality of empty spaces formed in the frames orthogonal to each other when the generation of oxygen is necessary.

The bonding portion 350 may be applied to one surface of the oxygen generating cover 300 so that the oxygen generating cover 300 may be bonded to the oxygen generating receptor barrier frame 250. As a result, the oxygen generating cover 300 may be firmly coupled to the oxygen generating receptor barrier frame 250 by being coupled not only to the rim of the oxygen generating receptor barrier frame 250 but also to the frames formed therein. Accordingly, it may be possible to prevent the oxygen generating cover 300 from being separated at an unwanted time and to block the oxygen generating material 10 from the outside more stably. When the life-saving towel according to the present disclosure is not in use and only stored for emergency use, the oxygen generating cover 300 may be firmly in contact with the oxygen generating receptor barrier frame 250 by the adhesive strength of the bonding portion 350, and, in the event of an emergency such as a fire, the oxygen generating cover 300 may be removed so that oxygen may be generated from the oxygen generating material 10 accommodated in the oxygen generating receptor 200. Consequently, the inflow of toxic gas from the outside may be blocked by the filter sheet 100, and oxygen may be introduced into a user's respiratory tract through the empty spaces of the oxygen generating receptor barrier frame 250 in the direction of the user's respiratory tract, thereby increasing the user's survival time.

Meanwhile, FIG. 2 is a schematic exploded perspective view of a life-saving towel according to another embodiment of the present disclosure. In addition, FIG. 3 is a view for describing how an oxygen generating cover is coupled to a filter sheet of the life-saving towel in FIG. 2, and FIG. 4 is a view for describing how the oxygen generating cover is coupled to the filter sheet of the life-saving towel in FIG. 2 and a view of the sheet viewed from another direction after the coupling has been made as shown in FIG. 3.

Referring to FIGS. 2 to 4, in the case of the life-saving towel according to another embodiment of the present disclosure, the oxygen generating receptor 200 may further include an oxygen generating receptor rib 210 formed on an edge portion thereof; the filter sheet 100 may include an area as an empty space in a shape corresponding to the shape of the horizontal surface of the oxygen generating receptor 200 and may further include an oxygen generating receptor coupling frame 220 having a shape corresponding to the shape of the oxygen generating receptor rib 210 and including an empty space formed inside the rim; the oxygen generating receptor rib 210 of the oxygen generating receptor 200 may be in contact with the other surface of the filter sheet 100, and the oxygen generating receptor 200 may penetrate the area formed as an empty space of the filter sheet 100 and may be disposed on one side of the filter sheet 100; the oxygen generating receptor coupling frame 220 may pass through the oxygen generating receptor 200 on one side of the filter sheet 100 and may be coupled and fixed to the oxygen generating receptor rib 210 with a part of the filter sheet 100 interposed therebetween; and the oxygen generating receptor barrier frame 250 may be directly coupled to the other surface of the oxygen generating receptor rib 210.

Unlike the life-saving towel in FIG. 1, in the case of the life-saving towel according to another embodiment of the present disclosure, the oxygen generating receptor rib 210 formed on the oxygen generating receptor 200 may be coupled to the filter sheet 100 with the oxygen generating receptor coupling frame 220 and the filter sheet 100 interposed therebetween. In addition, the filter sheet 100 may include the area as an empty space in a shape corresponding to the shape of the horizontal surface of the oxygen generating receptor 200, and the oxygen generating receptor rib 210 formed on the rim of the oxygen generating receptor 200 may be disposed to be in contact with the other surface of the filter sheet 100, so that the portion of the oxygen generating receptor 200 in which the oxygen generating material 10 is accommodated may pass through the empty space of the filter sheet 100 and may be disposed on one side of the filter sheet 100. That is, as the oxygen generating receptor 200 may pass through the empty space of the filter sheet 100 and may be disposed on one surface of the filter sheet 100, the oxygen generating receptor rib 210 may be disposed to support the other surface of the filter sheet 100, which is opposite thereto. The oxygen generating receptor coupling frame 220 may pass through the filter sheet 100 and come into contact with the filter sheet 100 in the same direction as the oxygen generating receptor 200 disposed on one surface of the filter sheet 100, and may be in a shape corresponding to the shape of the oxygen generating receptor rib 210 and have an empty space formed inside the rim, so that the oxygen generating receptor coupling frame 220 and the oxygen generating receptor rib 210 may be bonded and coupled to each other. Accordingly, the oxygen generating receptor coupling frame 220 and the oxygen generating receptor rib 210 may be coupled to the filter sheet 100 with a part of the filter sheet 100 interposed therebetween, which also has the shape of a horizontal plane.

In other words, the oxygen generating receptor 200 may pass through the area formed as an empty space of the filter sheet 100 and may be disposed on one side of the filter sheet 100 while the oxygen generating receptor rib 210 may be in contact with the other surface of the filter sheet 100, and the oxygen generating receptor coupling frame 220 may pass through the oxygen generating receptor 200 on one side of the filter sheet 100 and may be coupled and fixed to the oxygen generating receptor rib 210 with a part of the filter sheet 100 interposed therebetween. In the meantime, the oxygen generating receptor rib 210 and the oxygen generating receptor coupling frame 220 may be coupled to each other by thermal fusion, but the present disclosure is not limited thereto. That is, the oxygen generating receptor rib 210 and the oxygen generating receptor coupling frame 220 may be coupled to each other by a physical method such as concavo-convex (凹凸) bonding by penetrating a part of the filter sheet 100 interposed therebetween as necessary.

As described above, the oxygen generating receptor coupling frame 220 may be coupled to the oxygen generating receptor rib 210 on one surface of the filter sheet 100 to which the oxygen generating receptor 200 is exposed through the empty space of the filter sheet 100 while the oxygen generating receptor rib 210 is in contact with the other side of the filter sheet 100. As a result, the space in the oxygen generating receptor 200 in which the oxygen generating material 10 is stored may be disposed on one side of the filter sheet 100, and it may be possible that oxygen generated in the oxygen generating receptor 200 flows only to an open portion on the other side of the filter sheet 100 and that a portion protruding beyond the horizontal surface of the filter sheet 100 is minimized on the other side of the filter sheet 100. In addition, the oxygen generating receptor rib 210 may be disposed on the other surface of the filter sheet 100, and the oxygen generating receptor coupling frame 220 on one side of the filter sheet 100 where the exposed portion of the oxygen generating receptor 200 is disposed may be coupled with the oxygen generating receptor rib 210. Consequently, even when force is applied to separate the oxygen generating cover 300, it may be possible that the oxygen generating receptor 200 remains more firmly coupled to the filter sheet 100.

On the other hand, the oxygen generating receptor barrier frame 250 may be coupled directly to the other surface of the oxygen generating receptor rib 210, and the oxygen generating receptor barrier frame 250 may be coupled with the oxygen generating receptor rib 210, as an oxygen generating receptor coupling hole 215 on the oxygen generating receptor rib 210 may be bonded to a corresponding depression on the oxygen generating receptor barrier frame 250 by the concavo-convex (凹凸) bonding.

As described above, the oxygen generating receptor rib 210 may be coupled to the oxygen generating receptor coupling frame 220 with the filter sheet 100 interposed therebetween. As a result, the oxygen generating receptor 200 may be more firmly bonded to the filter sheet 100 and it may be possible to minimize the protruding part on the other surface of the filter sheet 100, which is the part where oxygen is generated and to allow oxygen to flow from the open part of the oxygen generating receptor 200 to a user's respiratory tract. In addition, by the oxygen generating receptor barrier frame 250 coupled to the oxygen generating receptor rib 210, it may be possible to prevent the oxygen generating material 10 from leaking out through the open portion of the oxygen generating receptor 200 and to supply generated oxygen through the open portion of the oxygen generating receptor barrier frame 250 only when necessary.

In this way, the oxygen generating receptor rib 210 and the oxygen generating receptor coupling frame 220 may be separately coupled to each other on the portion coupled to the filter sheet 100 to fix the oxygen generating receptor 200 to the filter sheet 100, the oxygen generating receptor barrier frame 250 may be separately coupled to the oxygen generating receptor rib 210 to secure a portion where the oxygen generating cover 300 is to be coupled, and a portion that is coupled and fixed to the filter sheet 100 and a portion to which the oxygen generating cover 300 is coupled may be separated from each other. Furthermore, the open part may be closed by separately coupling the oxygen generating receptor barrier frame 250 while the oxygen generating material 10 is placed in the oxygen generating receptor 200, and the oxygen generating cover 300 may be bonded to the oxygen generating receptor barrier frame 250, thereby manufacturing the life-saving towel more easily. In addition, as described above, as the frames cross each other, an empty space may be secured in the oxygen generating receptor barrier frame 250, so that oxygen can move and the oxygen generating cover 300 may remain stably bonded thereto.

FIG. 5 is a perspective view of the life-saving towel according to an embodiment of the present disclosure, and FIG. 6 is a cross-sectional view of a cross section of the filter sheet taken along the line A-A' in FIG. 5.

Referring to FIGS. 5 and 6, the filter sheet applied to the life-saving towel according to an embodiment of the present disclosure may include a first layer 110 made of a material containing rayon, a second layer 120 disposed on one side of the first layer 110 and made of a material containing activated carbon in a polypropylene material, a third layer 130 disposed on one side of the second layer 120 and consisting of a melt blown filter containing a polypropylene material, a fourth layer 140 disposed on one side of the third layer 130 and made of a material containing activated carbon in a polypropylene material, and a fifth layer 150 disposed on one side of the fourth layer 140 and made of a material containing rayon. As such, the filter sheet 100 may include the first layer 110 to the fifth layer 150 sequentially arranged so that external harmful gases may be blocked. That is, it may be possible to filter harmful gases such as carbon dioxide, formaldehyde, sulfur dioxide, nitrogen dioxide, and ammonia.

In addition, the filter sheet may contain natural extracts contained in the first layer 110 to the fifth layer 150, and the natural extracts may include at least one of propolis extracts, green tea extracts, tea tree extracts, lavender extracts, rosemary flower extracts, peppermint extracts, corn mint leaf extracts, matricaria extracts, and water lily flower extracts. Since the filter sheet may contain the natural extracts, it may be possible to enable users who use the life-saving towel in an emergency to feel safe.

Meanwhile, the first layer 110 and the fifth layer 150 may have a weight of 20 g to 30 g based on a width of 1 $m^2$, the second layer 120 and the fourth layer 140 may have a weight of 35 g to 45 g based on a width of 1 $m^2$, and the third layer 130 may have a weight of 20 g to 30 g based on a width of 1 $m^2$. The filter sheet may be formed in a five-layer structure to block harmful gases and include activated carbon in the second layer 120 and the fourth layer 140, so that air permeability may be weakened. However, with the weight range of each layer as described above, breathability may be secured while harmful gases are blocked so that a user can breathe.

In the meantime, FIG. 7 is a perspective view of a life-saving towel according to still another embodiment of the present disclosure.

Referring to FIG. 7, the life-saving towel may further include straps 410 and 420 coupled to one surface of the filter sheet 100 to which the oxygen generating receptor 200 is exposed, and both ends of the straps 410 and 420 may be coupled to one surface of the filter sheet 100 while middle portions thereof may be spaced apart therefrom. More specifically, the straps 410 and 420 may include a first strap 410 and a second strap 420 spaced apart from each other on both sides of one surface of the filter sheet 100 with the oxygen generating receptor 200 interposed therebetween, and the middle portions of the first strap 410 and the second strap 420 spaced apart from the surface of the filter sheet 100 may face each other with the oxygen generating receptor 200 interposed therebetween.

Since the straps 410 and 420 may be coupled to one surface of the filter sheet 100 to which the oxygen generating receptor 200 is exposed, a user can put his/her hand into the straps 410 and 420 and grip the oxygen generating receptor 200, accurately recognizing the part where oxygen is generated while holding the life-saving towel stably.

Meanwhile, FIG. 8 is a perspective view of the filter sheet applied to the life-saving towel according to another embodiment of the present disclosure.

Referring to FIG. 8 and back to FIGS. 5 and 6, the filter sheet may further include a plurality of hardened balls spaced apart from each other and formed of a thermosetting resin composition between the second layer 120 and the third layer 130 and between the third layer 130 and the fourth layer 140. As described with respect to FIGS. 5 and 6, the filter sheet 100 according to the present disclosure may be formed in a five-layer structure of the first layer 110 to the fifth layer 150 and may include the plurality of hardened balls, which may be hardened by heat compression, between the second layer 120 and the third layer 130 and between the third layer 130 and the fourth layer 140. As a result, the second layer 120 and the third layer 130, and the third layer 130 and the fourth layer 140 may remain coupled to each other more firmly, and air permeability may be secured. The hardened balls may remain formed of a thermosetting resin composition before the manufacture of the filter sheet 100 is completed and may be thermally cured and changed into a strain-hardened ball after applying heat and pressure, and the second layer 120 and the third layer 130, and the third layer 130 and the fourth layer 140 may be firmly coupled to each other by the hardened balls changed into a strain-hardened ball.

FIG. 9 is a schematic view of a cross section of the filter sheet in FIG. 8, and FIG. 10 is a schematic view of a cross section of the filter sheet in FIG. 9 taken after heat treatment.

Referring to FIGS. 9 and 10, some of the plurality of hardened balls may be thermally cured and exist in the form of a strain-hardened ball, and the second layer and the third layer or the third layer and the fourth layer may be coupled to each other by the strain-hardened balls. That is, as shown in FIG. 8, the plurality of hardened balls may be arranged, and some thereof may be hardened by heat treatment, so that the layers may be firmly coupled to each other. However, for convenience in the manufacturing process, heat may not be transferred to some hardened balls, so they may remain uncured.

FIG. 11 is a schematic view of the filter sheet according to still another embodiment of the present disclosure.

Referring to FIG. 11, on the horizontal surface of the sheet of the life-saving towel, the hardened balls or the strain-hardened balls may be disposed at a higher density in the area PN surrounding the area P where the oxygen generating receptor rib and the oxygen generating receptor barrier frame are coupled to each other than in other areas. Accordingly, when the oxygen generating receptor rib and the oxygen generating receptor barrier frame are bonded to each other by thermal compression with the filter sheet 100 interposed therebetween, they may be more firmly bonded to each other.

FIG. 12 is a perspective view schematically illustrating how the life-saving towel according to still another embodiment of the present disclosure is folded. In addition, FIG. 13 is a perspective view of the unfolded life-saving towel in FIG. 12, and FIG. 14 is a view of a cross section of the folded life-saving towel in FIG. 12. Furthermore, FIG. 15 is a perspective view of the oxygen generating cover according to an embodiment of the present disclosure, and FIG. 16 is a perspective view schematically illustrating a cover opening member according to an embodiment of the present disclosure.

Referring to FIGS. 12 to 16, the oxygen generating cover 300 may include an oxygen generating cover protruding surface 310 protruding from one side of the oxygen generating cover 300 so as not to come into contact with the oxygen generating receptor barrier frame 250 and an oxygen generating cover through-hole 320 penetrating the oxygen generating cover protruding surface 310 in a vertical direction, the filter sheet 100 may further include a cover opening member 600 having one end coupled to the filter sheet 100 and spaced apart from a portion where the oxygen generating receptor 200 is coupled, and the other end of the cover opening member 600 may be connected to the oxygen generating cover through-hole 320.

The oxygen generating cover 300 may be bonded to the oxygen generating receptor barrier frame 250 so that the oxygen generating material 10 may be sealed within the oxygen generating cover 300 and the oxygen generating receptor 200. The oxygen generating cover protruding surface 310 may protrude from one side of the oxygen generating cover 300 so as not to come into contact with the oxygen generating receptor barrier frame 250, and may have the oxygen generating cover through-hole 320 penetrating the oxygen generating cover protruding surface 310 in a vertical direction so that the cover opening member 600 may be coupled thereto. In addition, the filter sheet 100 may further include the cover opening member 600 having one end coupled to the filter sheet 100 and spaced apart from a portion where the oxygen generating receptor 200 is coupled, and the other end of the cover opening member 600 may be coupled to the oxygen generating cover through-hole 320, so that the oxygen generating cover 300 may be easily separated by the cover opening member 600 when the folded filter sheet 100 is unfolded. A power outage, etc. may occur in the event of an emergency such as a fire so that a user may be unable to easily find the oxygen generating cover 300 or may get too embarrassed to take off the oxygen generating cover 300. However, when the other end of the cover opening member 600 is coupled to the oxygen generating cover through-hole 320 as disclosed in the present disclosure, the oxygen generating cover 300 may be separated from the oxygen generating receptor barrier frame 250 to immediately generate oxygen at the same time as the folded filter sheet 100 is unfolded as shown in FIG. 13.

In other words, one end of the cover opening member 600 may pass through the filter sheet 100 to be coupled thereto, and the other end thereof may be coupled to the oxygen generating cover through-hole 320. Consequently, when the folded filter sheet 100 is unfolded while one end of the cover opening member 600 is fixed to the filter sheet 100, the oxygen generating cover 300 may be taken off by the oxygen generating cover through-hole 320 coupled to the other end of the cover opening member 600.

In the meantime, the adhesive strength of the bonding portion 350 coupled to the oxygen generating cover 300 may be in the range of 25 N/25 mm to 35 N/25 mm at 50% humidity and in the range of 25 N/25 mm to 35 N/25 mm at 85% humidity. Waterproofness and moisture resistance properties of IPX8 level may be secured in the above-mentioned range. More specifically, when the width of the oxygen generating cover 300 on which the bonding portion 350 is formed is 25 mm and the bonding portion 350 is formed all over one surface of the oxygen generating cover 300, the adhesive strength in the range of 25 N/25 mm to 35 N/25 mm may be secured in a test in which the oxygen generating cover 300 is attached to an adherend stainless steel and peeled at 180 degrees at 50% and 85% humidity and a temperature of 23° C. The adhesive strength can also be expressed as peel force.

Since the oxygen generating cover 300 may have moisture-proofing as described above by the bonding portion 350, it may be possible to prevent unnecessary generation of oxygen when the life-saving towel is not in use and only stored. In addition, since the bonding portion 350 may be formed of the above-mentioned material and have the aforementioned adhesive strength, it may be possible to block the internal oxygen generating material 10 from the outside more effectively while storing the same. In other words, when the above-mentioned adhesive strength is not secured, moisture or air may flow into the oxygen generating receptor 200 while the folded life-saving towel is stored, and oxygen may be generated unnecessarily, increasing the volume of the oxygen generating receptor 200, so that the oxygen generating cover 300 may swell and may be peeled off. However, this may be effectively prevented with the adhesive strength in the above-mentioned range. Furthermore, when the adhesive force in the above-mentioned range is secured, it may be possible to peel off the oxygen generating cover 300 without difficulty, if necessary.

Meanwhile, since the bonding portion 350 may have the adhesive strength as described above, it may be possible to prevent oxygen from being generated due to contact with the outside (or external factors introduced due to deterioration of airtightness) when the lifesaving towel is not in use. On the other hand, due to the high adhesive strength, the oxygen generating cover 300 may not be easily peeled off when a user intends to use it. Therefore, sufficient force may be applied to peel off the oxygen generating cover 300 by the cover opening member 600 coupled to the oxygen generating cover through-hole 320 at the same time as the folded filter sheet is unfolded.

In addition, at least two oxygen generating cover through-holes 320 may be disposed spaced apart from each other. Since at least two oxygen generating cover through-holes 320 are disposed spaced apart from each other, even when the oxygen generating cover 300 adhered with the adhesive strength in the above-mentioned range is peeled off with strong force, the oxygen generating cover through-hole 320 may not be torn or damaged, and the oxygen generating cover 300 may remain stably coupled to the cover opening member 600 when being peeled off the oxygen generating receptor barrier frame 250.

Meanwhile, to describe the cover opening member 600 in more detail, the cover opening member 600 may include: an outer sheet support portion 610 that penetrates the filter sheet 100 to support one surface of the filter sheet 100 and has a larger area than the area through which the outer sheet support portion 610 passes; an inner sheet support portion 620 that extends from the outer sheet support portion 610, penetrates the filter sheet 100 to support the other surface of the filter sheet 100, and has a larger area than the area through which the inner sheet support portion 620 passes; and a cover support portion 630 that extends from the inner sheet support portion 620, penetrates the oxygen generating cover through-hole 320 to support one surface of the oxygen generating cover through-hole 320, and has a larger area than the area through which the cover support portion 630 passes. In addition, when the filter sheet 100 of the lifesaving towel is folded, the outer sheet support portion 610, the inner sheet support portion 620, and the cover support portion 630 of the cover opening member 600 and the oxygen generating cover through-hole 320 may be vertically positioned on a straight line.

The cover opening member 600 may include the outer sheet support portion 610, the inner sheet support portion 620, and the cover support portion 630, and the outer sheet support portion 610 may penetrate the filter sheet 100 to support one surface of the filter sheet 100 and have a larger area than the area through which the outer sheet support portion 610 passes, so as to remain fixed to the filter sheet 100 without being separated therefrom. In addition, the inner sheet support portion 620 may extend from the outer sheet support portion 610, penetrate the filter sheet 100 to support the other surface of the filter sheet 100, and have a larger area than the area through which the inner sheet support portion 620 passes, so as to fix the filter sheet 100 between the outer sheet support portion 610 and the inner sheet support portion 620. Furthermore, the cover support portion 630 may extend from the inner sheet support portion 620, penetrate the oxygen generating cover through-hole 320 to support one surface of the oxygen generating cover through-hole 320, and have a larger area than the area through which the cover support portion 630 passes, so as to be fixed to the oxygen generating cover through-hole 320 without being separated therefrom. Accordingly, the oxygen generating cover 300 may be peeled off when the oxygen generating receptor barrier frame 250 is separated as the filter sheet 100 fixed to the other end of the cover opening member 600 is unfolded.

FIG. 17 is an exploded perspective view schematically illustrating the cover opening member in FIG. 16.

Referring to FIG. 17, the inner sheet support portion 620 may further include an inner sheet support portion first connection portion 621 formed at one end and an inner sheet support portion second connection portion 622 formed at the other end, the cover support portion 630 may further include a cover support portion connection portion 632 formed at the other end and coupled to the inner sheet support portion first connection portion 621, and the outer sheet support portion 610 may further include an outer sheet support portion connection portion 611 formed at one end and coupled to the inner sheet support portion second connection portion 622. That is, the cover support portion connection portion 632 may be connected to the inner sheet support portion first connection portion 621 formed at the inner sheet support portion 620, and the inner sheet support portion first connection portion 621 may be connected to the outer sheet support portion connection portion 611 formed at the outer sheet support portion 610, so that the cover opening member in which the components are coupled to each other may be formed. Since the components may be separated from and coupled with each other, it may be possible to assemble the cover opening member easily after the filter sheet 100 has been manufactured and to couple the cover opening member to the oxygen generating cover through-hole 320 of the oxygen generating cover 300 easily.

Meanwhile, FIG. 18 is a top view of the oxygen generating cover coupled to the oxygen generating device according to still another embodiment of the present disclosure, FIG. 19 is a view of the oxygen generating cover coupled to the oxygen generating device in FIG. 18, which is viewed from one side, and FIG. 20 is a view of the oxygen generating cover coupled to the oxygen generating device in FIG. 18, which is viewed from another side.

Referring to FIGS. 18 to 20, the cover opening member according to still another embodiment of the present disclosure may include: the cover support portion 630 having one end passing through the oxygen generating cover through-hole 320 and a bottom end larger than the oxygen generating cover through-hole 320; the outer sheet support portion 610 that has the other end passing through the filter sheet 100 to support the filter sheet 100 on one surface of the filter sheet 100, includes an end larger than the area where the outer sheet support portion 610 passes through the filter sheet 100, and extends from the cover support portion 630; and the inner sheet support portion 620 coupled between the outer sheet support portion 610 and the oxygen generating cover through-hole 320 and supporting the filter sheet 100 on the other surface of the filter sheet 100. In addition, as described above, when the filter sheet 100 of the life-saving towel is folded, the outer sheet support portion 610, the inner sheet support portion 620, and the cover support portion 630 of the cover opening member 600 and the oxygen generating cover through-hole 320 may be vertically positioned on a straight line. That is, the cover opening member in FIGS. 19 to 21 may have a structure in which the outer sheet support portion 610 and the cover support portion 630 are formed and the inner sheet support portion 620 is coupled to a portion connecting them.

FIG. 21 is a schematic view of the filter sheet according to still another embodiment of the present disclosure.

Referring to FIG. 21, the hardened balls described in connection with the filter sheet may be disposed at a higher density in the area TN surrounding the area T in which the cover opening member is formed. In addition, in the process of assembling the cover opening member 600, heat may be applied to an area of the filter sheet in which the cover opening member 600 is disposed, so that it may be possible to allow the components of the cover opening member 600 to remain more firmly coupled to each other at the position where they are coupled to each other with the filter sheet 100 interposed therebetween and to prevent the filter sheet 100 from being torn at the position.

Meanwhile, FIG. 22 is a perspective view of the oxygen generating receptor rib of the oxygen generating device according to another embodiment of the present disclosure, and FIG. 23 is a perspective view of the oxygen generating receptor barrier frame coupled to the oxygen generating device in FIG. 22 according to another embodiment of the present disclosure.

Referring to FIGS. 22 and 23, the oxygen generating receptor rib 210 may further include an oxygen generating receptor rib depressed line 216 formed as a depressed line within the other surface of the oxygen generating receptor rib 210 and extending along the rim of the oxygen generating receptor rib 210 to form a single closed curve line, and the oxygen generating receptor barrier frame 250 may further include an oxygen generating receptor barrier frame protruding line 256 formed as a line protruding outward from one surface of the oxygen generating receptor barrier frame 250 and forming a single closed curve line to be inserted into the oxygen generating receptor rib depressed line 216.

The oxygen generating receptor rib depressed line 216 and the oxygen generating receptor barrier frame protruding line 256 may be coupled to each other while facing each other, and a separate adhesive material may be further included between the oxygen generating receptor rib depressed line 216 and the oxygen generating receptor barrier frame protruding line 256 to improve the bonding and airtightness. By the oxygen generating receptor rib depressed line 216 and the oxygen generating receptor barrier frame protruding line 256 coupled thereto, it may be possible to minimize deterioration of the airtightness of the oxygen generating material accommodated therein caused by leaks or empty voids that may occur due to the coupling between the oxygen generating receptor barrier frame 250 and the oxygen generating receptor rib 210.

While the present disclosure has been described with reference to exemplary embodiments thereof, it will be understood by those of ordinary skill in the art that various changes in form and detail may be made therein without departing from the spirit and scope of the present disclosure. Therefore, the above-described embodiments should be considered in a descriptive sense only, and not for purposes of limitation.

The invention claimed is:
1. A life-saving towel comprising:
a filter sheet;
an oxygen generating receptor in which an oxygen generating material is accommodated and which is coupled to one surface of the filter sheet;
an oxygen generating receptor barrier frame in contact with the other surface of the filter sheet, which is coupled to the oxygen generating receptor with the filter sheet interposed therebetween and has a plurality of empty spaces formed therein; and
an oxygen generating cover in contact with the other surface of the oxygen generating receptor barrier frame to cover all of the plurality of empty spaces of the oxygen generating receptor barrier frame and having a bonding portion formed on one surface to be bonded to the oxygen generating receptor barrier frame,
wherein the oxygen generating cover includes an oxygen generating cover protruding surface protruding from one side of the oxygen generating cover so as not to come into contact with the oxygen generating receptor barrier frame and an oxygen generating cover through-hole penetrating the oxygen generating cover protruding surface in a vertical direction,
wherein the filter sheet further includes a cover opening member having one end coupled to the filter sheet and spaced apart from a portion where the oxygen generating receptor is coupled, and
wherein the other end of the cover opening member is connected to the oxygen generating cover through-hole.
2. The life-saving towel of claim 1, wherein the oxygen generating receptor further includes an oxygen generating receptor rib formed on an edge portion, the filter sheet includes an area as an empty space in a shape corresponding to the shape of the horizontal surface of the oxygen generating receptor, there is further included an oxygen generating receptor coupling frame having an empty space formed inside the rim in a shape corresponding to the shape of the oxygen generating receptor rib, while the oxygen generating receptor rib is in contact with the other surface of the filter sheet, the oxygen generating receptor is disposed on one surface of the filter sheet through the area as an empty space of the filter sheet, the oxygen generating receptor coupling frame passes through the oxygen generating receptor on one surface of the filter sheet and is coupled and fixed to the oxygen generating receptor rib with a part of the filter sheet interposed therebetween, and the oxygen generating receptor barrier frame is directly coupled to the other surface of the oxygen generating receptor rib.

3. The life-saving towel of claim 2,
wherein the oxygen generating receptor rib and the oxygen generating receptor coupling frame are coupled to each other by thermal fusion, and the oxygen generating receptor barrier frame is coupled with the oxygen generating receptor rib as an oxygen generating receptor coupling hole on the oxygen generating receptor rib is bonded to a corresponding depression on the oxygen generating receptor barrier frame by the concavo-convex (凹 凸) bonding.

4. The life-saving towel of claim 2, further comprising:
an oxygen generating receptor rib depressed line formed as a depressed line within the other surface of the oxygen generating receptor rib and extending along the rim of the oxygen generating receptor rib to form a single closed curve line; and an oxygen generating receptor barrier frame protruding line that is formed as a line protruding outward from one surface of the oxygen generating receptor barrier frame and forms a single closed curve line to be inserted into the oxygen generating receptor rib depressed line.

5. The life-saving towel of claim 1,
wherein the oxygen generating material includes activated carbon, 5 to 50 parts by weight of a metal peroxide, and 0.001 to 5 parts by weight of a catalyst based on 100 parts by weight of the activated carbon, and the activated carbon is at least one of palm, wood, and coal; the metal peroxide is at least one of calcium peroxide, magnesium peroxide, potassium peroxide, barium peroxide, and sodium peroxide; and the catalyst is at least one of catalase, peroxidase, potassium iodide, and manganese dioxide.

6. The life-saving towel of claim 1, further comprising straps coupled to one surface of the filter sheet to which the oxygen generating receptor is exposed,
wherein both ends of the straps are coupled to one surface of the filter sheet while middle portions thereof are spaced apart therefrom.

7. The life-saving towel of claim 6,
wherein the straps include a first strap and a second strap spaced apart from each other on both sides of one surface of the filter sheet with the oxygen generating receptor interposed therebetween, and the middle portions of the first strap and the second strap spaced apart from the surface of the filter sheet face each other with the oxygen generating receptor interposed therebetween.

8. The life-saving towel of claim 1, wherein the adhesive strength of the bonding portion is in the range of 25 N/25 mm to 35 N/25 mm at 50% humidity and in the range of 25 N/25 mm to 35 N/25 mm at 85% humidity.

9. The life-saving towel of claim 1, wherein at least two oxygen generating cover through-holes are disposed spaced apart from each other.

10. The life-saving towel of claim 1, wherein the cover opening member has one end penetrating the filter sheet to be coupled thereto and the other end coupled to the oxygen generating cover through-hole.

11. The life-saving towel of claim 10, wherein the cover opening member includes:
an outer sheet support portion that penetrates the filter sheet to support one surface of the filter sheet and has a larger area than the area through which the outer sheet support portion passes;

an inner sheet support portion that extends from the outer sheet support portion, penetrates the filter sheet to support the other surface of the filter sheet, and has a larger area than the area through which the inner sheet support portion passes; and a cover support portion that extends from the inner sheet support portion, penetrates the oxygen generating cover through-hole to support one surface of the oxygen generating cover through-hole, and has a larger area than the area through which the cover support portion passes.

12. The life-saving towel of claim 11,
wherein the inner sheet support portion further includes an inner sheet support portion first connection portion formed at one end and an inner sheet support portion second connection portion formed at the other end, the cover support portion further includes a cover support portion connection portion formed at the other end and coupled to the inner sheet support portion first connection portion, and the outer sheet support portion further includes an outer sheet support portion connection portion formed at one end and coupled to the inner sheet support portion second connection portion.

13. The life-saving towel of claim 11, wherein, when the filter sheet of the life-saving towel is folded, the outer sheet support portion, the inner sheet support portion, and the cover support portion of the cover opening member and the oxygen generating cover through-hole are vertically positioned on a straight line.

14. The life-saving towel of claim 1, wherein the cover opening member includes:
the cover support portion having one end passing through the oxygen generating cover through-hole and a bottom end larger than the oxygen generating cover through-hole;

the outer sheet support portion that has the other end passing through the filter sheet to support the filter sheet on one surface of the filter sheet, includes one end larger than the area where the outer sheet support portion passes through the filter sheet, and extends from the cover support portion; and the inner sheet support portion coupled between the outer sheet support portion and the oxygen generating cover through-hole and supporting the filter sheet on the other surface of the filter sheet.

15. The life-saving towel of claim 14, wherein, when the filter sheet of the life-saving towel is folded, the outer sheet support portion, the inner sheet support portion, and the cover support portion of the cover opening member and the oxygen generating cover through-hole are vertically positioned on a straight line.

* * * * *